United States Patent

[11] 3,604,422

[72] Inventor Reinhardt N. Sabee
 728 South Summit St., Appleton, Wis. 54911
[21] Appl. No. 767,940
[22] Filed Oct. 16, 1968
[45] Patented Sept. 14, 1971

[54] DIAPER WITH SOFT EDGES AND NONLEAKING SIDE SEAL
 13 Claims, 3 Drawing Figs.
[52] U.S. Cl. ..................................................... 128/287
[51] Int. Cl. ................................................ A61f 13/16
[50] Field of Search ............................................. 178/284, 286, 287, 290

[56] References Cited
UNITED STATES PATENTS

| | | | |
|---|---|---|---|
| 2,896,626 | 7/1959 | Voigtman .................... | 128/287 |
| 3,065,751 | 11/1962 | Gobbo, Sr. et al. ........... | 128/287 |
| 3,230,955 | 1/1966 | Joa et al. ..................... | 128/290 |
| 3,294,091 | 12/1966 | Morse .......................... | 128/290 |
| 3,344,789 | 10/1967 | Arnold et al. ................. | 128/287 |
| 3,375,827 | 4/1968 | Bletzinger et al. ............ | 128/290 |
| 3,386,442 | 6/1968 | Sabee .......................... | 128/287 |

Primary Examiner—Charles F. Rosenbaum
Attorney—Wheeler, House & Wheeler

ABSTRACT: In several alternative embodiments, soft flexible edge-sealing film extending about the sides of an absorbent pad is shown fastened to the bottom ply and also fastened to the exterior or interior surface of the facing ply, joined integrally with the facing ply or extrusion bonded to the facing ply. The edge seal strips are optionally flocked or faced with tissue for further softness. The separately fabricated edge-sealing strips may have properties or qualities differing from those of the backing, examples being softness, pliability, pin strength, and cost.

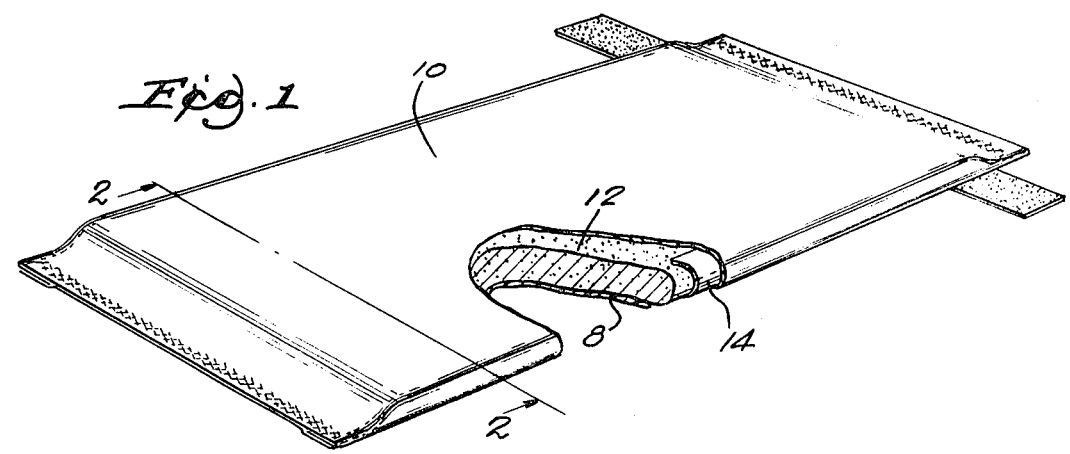
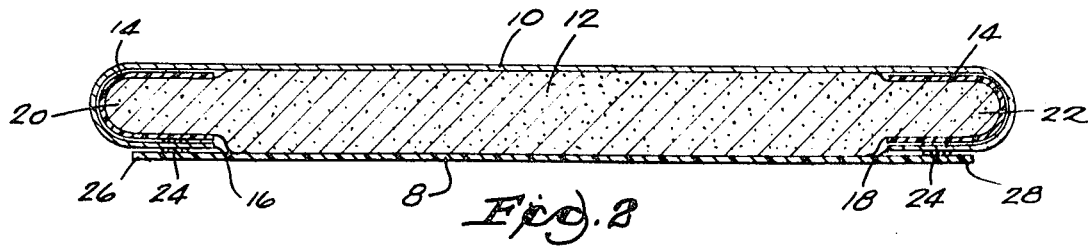
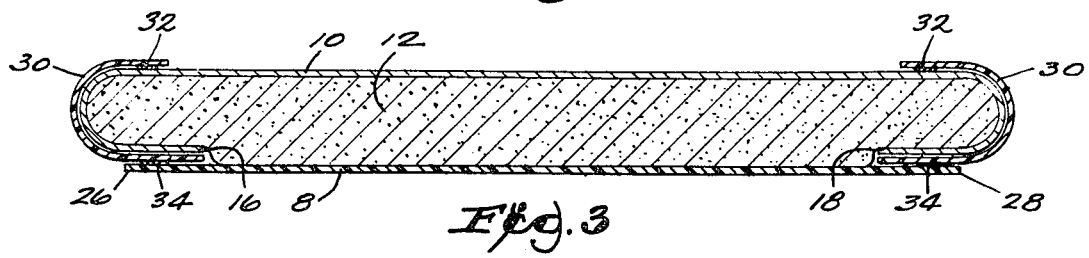
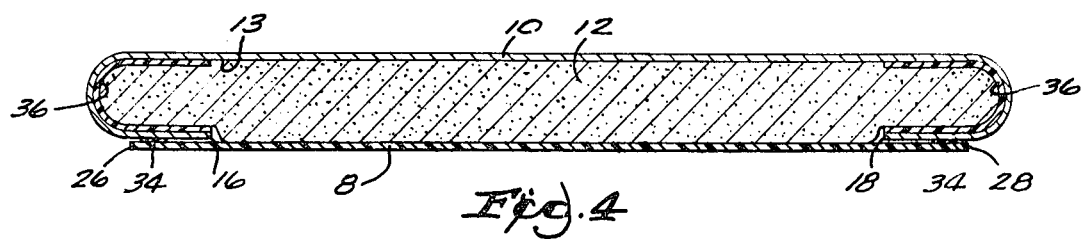
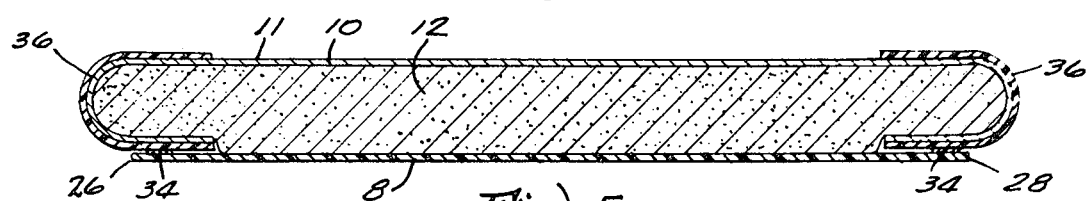
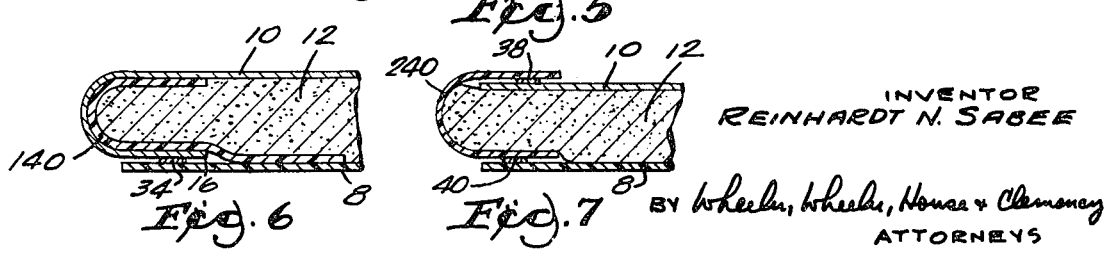
INVENTOR
REINHARDT N. SABEE
BY Wheeler, Wheeler, House & Clemency
ATTORNEYS

INVENTOR
REINHARDT N. SABEE

BY Wheeler, Wheeler, House & Clemency
ATTORNEYS 3,604,422

DIAPER WITH SOFT EDGES AND NONLEAKING SIDE SEAL

BACKGROUND OF THE INVENTION

A diaper which depends entirely on folding the edges of the backing ply around the absorbent pad to provide a marginal seal tends to be stiff and is quite apt to leak if the side margins or flaps are loose. On the other hand, if the backing ply is bonded to the face ply, the diaper frequently becomes so stiff that it does not conform well to the baby's legs. This is due to the fact that the backing ply has to be thick for adequate pin anchorage strength.

The present invention solves these problems by using a separately fabricated plastic film having any desired qualities of softness, flexibility or strength so that is is no longer necessary to rely on the backing ply for a lateral seal. The objective is to have sealing strips soft and flexible and to present a soft, smooth surface to the baby's skin regardless of the manner in which the strip is attached to the facing and backing plies.

SUMMARY OF THE INVENTION

As may be surmised from the foregoing, the invention consists in provision of a separately fabricated waterproof strip for the marginal seal. In one embodiment of the invention, the sealing ply is placed within the facing ply. The two plies together, both entirely flexible, are then bonded to the relatively heavy bottom ply or backing. In another embodiment of the invention, a sealing ply is made of thin film bonded marginally to the backing ply below the pad and carried around the margins of the diaper and then bonded to the facing ply. Since the facing ply is inherently soft, the sealing ply may be either on the inside or the outside for this purpose.

In still another embodiment of the invention, the sealing film is extrusion coated onto the facing ply to become a laterally projecting integral part thereof.

In still another embodiment of the invention, the edge-sealing film is an integrally extruded marginal extension of a nonwoven fabric used as a facing ply, so as to project laterally in the same plane and without any lap.

It is contemplated that in any one or more of these arrangements where a woven or nonwoven fabric is used as a facing ply, there my be an applique or nap or flock to soften the surface.

BRIEF DESCRIPTION OF DRAWINGS

FIG. 1 is a view in perspective showing a completed diaper embodying the invention, a portion thereof being broken away.

FIG. 2 is a view in transverse section on the line 2—2 of FIG. 1.

FIGS. 3, 4 and 5 are views similar to FIG. 2 showing different modified embodiments of the invention.

FIG. 6 is a fragmentary detail view in transverse section of a modified embodiment of the invention.

FIG. 7 is a fragmentary detail view similar to FIG. 6 showing a further modified embodiment of the invention.

DETAILED DESCRIPTION

Figure 8:
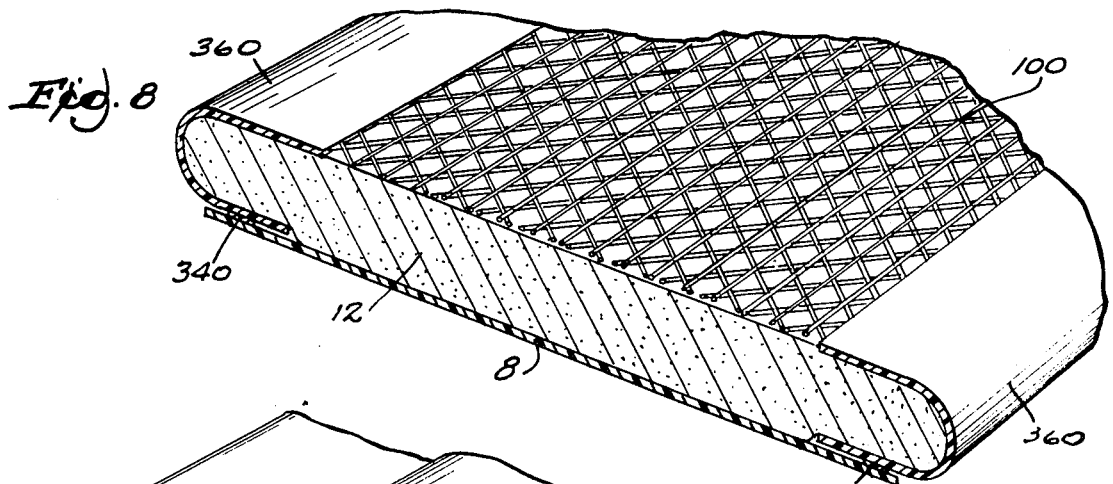
FIG. 8 is a fragmentary view in perspective broken away to a transverse section and showing a further modified embodiment of the invention.

As shown in FIGS. 1 and 2, the invention contemplates the use of a backing ply 8 and a facing ply 10 between which there is a filler or pad 12 which is preferably made of fluff to be soft and absorbent. A pad of laminations of creped tissue may also be used if desired.

In the construction shown in FIG. 2, two strips of thin, flexible, waterproof plastic film 14 extend interiorly along the side margins 16 and 18 of the facing strip 10 to be carried thereby tissue the corresponding side margins 20 and 22 of the absorbent filler pad 12. Beneath the filler pad, adhesive 24 is used to connect each of the side margins of the facing with the corresponding side margins 26 and 28 of the backing ply 8. The backing ply is not only impermeable but heavy enough to provide anchorage for diaper pins. It will be observed that marginal portions of the fabric cover or facing ply 10 intervene between the side seal strip 14 and the backing ply 8. Since the facing ply 10 is entirely permeable, being made either of tissue or woven or nonwoven fabric, it is readily penetrated by the adhesive to provide the type of three-ply connection shown.

In FIG. 3 the strips of impervious sealing film 30 extend about the sides of pad 12 along the outer surface of the facing ply 10. Since they are not confined by the facing ply as in the construction of FIG. 2, it is necessary to connect the sealing film strips to the facing ply as indicated by the lines of adhesive 32. With this arrangement, the margins 16 and 18 of the facing ply 10 are confined between the sealing film strips 30 and the pad 12, thereby requiring no bond to hold them in place. However, bond is required at 34 between the sealing strips and the surfaces of the side margins 26, 28 of the bottom ply 8.

In the construction shown in FIG. 7, the prefabricated side-sealing strip 240 is adhesively bonded at 38 to the facing ply 10 and is further bonded at 40 with the backing ply 8 after passing about the sides of the fluff pad or filler 12.

In the embodiment shown in FIG. 8, the facing ply 100 is narrower than those previously described. It may be extruded and, in fact, the sealing film strips 360 may be extruded as a part of the margins of the extruded facing ply, to constitute lateral extensions thereof. Obviously and strips may also be extrusion coated thereon as previously described. Hence they are in the same plane as the facing or cover ply to which they are bonded. Particularly if the cover ply 100 is a non woven fabric made of synthetic fibers or filaments, the extruded film strips 360 will readily fuse or bond thereto to project as integral parts thereof in the manner indicated. The connection of the cover ply to the bottom ply in this construction is effected through the sealing strips 360, the latter being attached adhesively at 340 in the manner already described.

Figure 9:
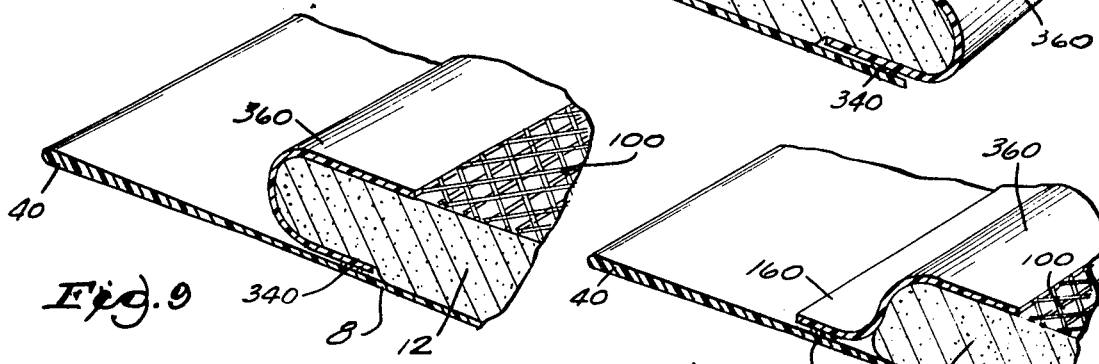
FIGS. 9 and 10 are fragmentary details in transverse section showing modifications of the embodiment illustrated in FIG. 8.

The construction shown in FIG. 9 may be identical with any of those previously described except for the fact that the bottom ply 8 is likewise extruded to provide a backing. As shown, it has greatly thickened marginal bead portions 40. Where this construction is used, it provides superior pin anchorage.

Figure 10:
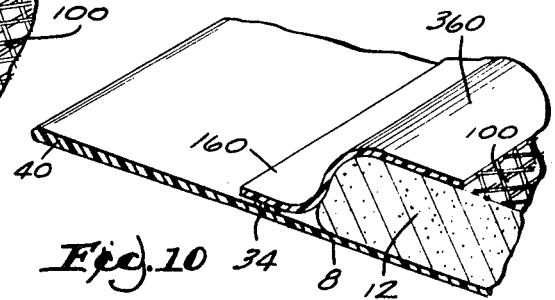

The construction shown in FIG. 10 differs from those previously described only in that the connection made by the adhesive line 34 to the backing ply 8 involves turning the margin 160 of the sealing strip and/or facing ply outwardly from, rather than inwardly beneath, the pad 12.

Figure 11:
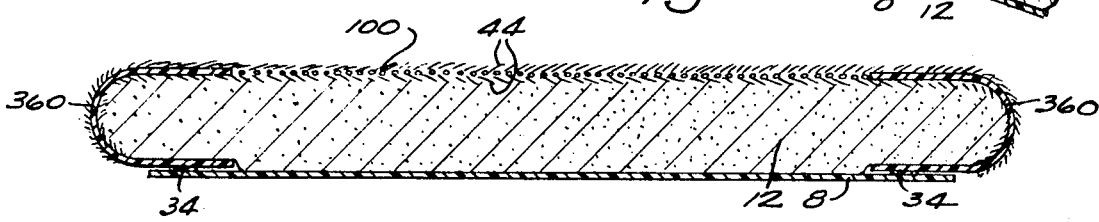
FIG. 11 is a view in transverse section of another modified embodiment of the invention.

FIG. 11 is an embodiment showing how any of the facing plies 10 or 100, as the case may be, may be rendered soft to the touch by flocking or by bonding fibers of natural or synthetic threads 44 to one or both sides of a nonwoven fabric, or to the surface of one of the waterproof films 36 or 360.

Figure 12:
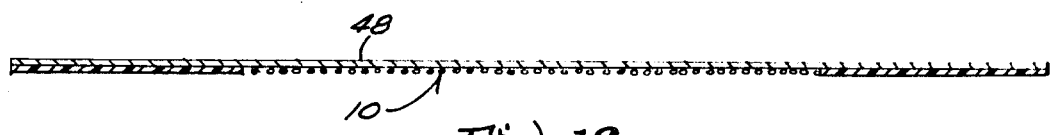
FIG. 12 is a view in transverse section through a laminated material used as a cover ply.

For producing a softness of somewhat comparable effect the nonwoven fabric or other cover ply 10 may have a layer of facial tissue 48 laminated thereto as shown in FIG. 12.

Figure 13:
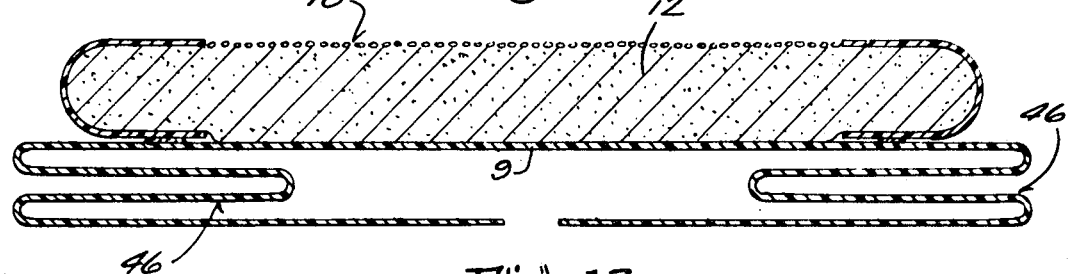
FIG. 13 is a view in transverse section through another modified embodiment of the invention.

FIG. 13 shows how any one of the foregoing embodiments may have the bottom ply 9 provided with folded extensions 46 of the such area that when unfolded, they will provide a waterproof sheet, in effect, for bed protection.

The seal provided in the various embodiments herein disclosed is much more effective than previously suggested seals, being so connected throughout its length that it cannot loosen while in use. At the same time, because it is fabricated independently of the rather heavy bottom ply, it can be made soft and light in weight and highly flexible to offer no harsh feeling to the skin of the user.

It will be observed that these results are achieved whether the marginal seal is on the outside or the inside of the facing, or is formed integrally with the facing to extend marginally therefrom, or is coated onto one or another of the surfaces of the facing.

Where adhesive has been referred to, it will be understood that this may be either a separate application or the bond may be achieved by a heat-sealing wheel or other applicator, assuming that the materials bonded are capable of heat seal connection. In any case, the resulting diaper is substantially leakproof and has improved comfort; yet it can be made at a cost comparable with, or less than, that of less satisfactory products.

I claim:

1. A diaper comprising the combination of an absorbent pad, a facing sheet, a backing sheet, and at least one sealing strip comprising an extrusion facially joined integrally in situ with a side portion of the facing ply sheet and extending about the side of the pad to a point beneath the pad.

2. A diaper comprising the combination of an absorbent pad, a facing sheet, a backing sheet, and at least one sealing strip comprising an extrusion facially joined with a side portion of the facing ply sheet and extending about the side of the pad to a point beneath the pad, said last mentioned facing sheet portion intervening between the strip and the backing sheet, and adhesive penetrating said portion and connecting the strip with the backing sheet as well as with the said portion of the facing sheet.

3. A diaper comprising the combination of an absorbent pad, a facing sheet, a backing sheet, and at least one sealing strip comprising an extrusion facially joined with a side portion of the facing ply sheet and extending about the side of the pad to a point beneath the pad, the facing sheet having a portion extending about the pad and having adhesive connection with the backing sheet, said portion being in face contact with said strip.

4. A diaper comprising the combination of an absorbent pad, a facing sheet, a backing sheet, and at least one sealing strip comprising an extrusion facially joined integrally in situ with a side portion of the facing ply sheet and extending about the side of the pad to a point beneath the pad, the said strip being marginally connected with the facing sheet above the pad and extending about a side margin of the pad and marginally connected with the backing sheet immediately below the pad, there being no lateral edges of the strip or facing sheet exposed beyond the said pad side margin.

5. A diaper according to claim 1 in which the facing sheet is nonwoven fabric with which said strip is in fused connection along the margin of the facing sheet.

6. A diaper comprising the combination with an absorbent pad, and a permeable facing ply and impermeable backing ply between which said pad is disposed, of strips of waterproof sealing film which is very materially thinner and more flexible than the backing ply and which strips extend lengthwise of the diaper along the side margins thereof and are folded about the side margins of the pad for substantially the whole length thereof, and means for anchoring at least the margins of said strips to preclude leakage from the diaper when the diaper is in use.

7. A diaper according to claim 6 in which the respective strips of film are inside of the facing ply, said facing ply having margins extending exteriorly of the strips of film about the pad and physically connected with the backing ply.

8. A diaper according to claim 6 in which the sealing strips extend about the pad externally of the facing ply and are marginally connected above the pad to the facing ply and below the pad to the backing ply.

9. A pad according to claim 6 in which the sealing film strips have margins constituting facial coatings on the facing ply.

10. A diaper according to claim 6 in which the sealing strip comprises an extrusion marginally integral with the facing ply to project laterally in the same plane.

11. A diaper according to claim 6 in which the backing ply has marginal portions projecting horizontally beyond the connection of the sealing strip therewith.

12. A diaper according to claim 6 in which the outer surface of the facing ply is provided with flock.

13. A diaper according to claim 12 in which the flock with which the cover ply is provided extends onto the exterior surface of the sealing strip at the sides of the diaper.